United States Patent [19]

Sayles

[11] E Re. 29,209

[45] Reissued May 10, 1977

[54] METHOD AND APPARATUS FOR CONTINUOUSLY SENSING THE CONDITION OF A GAS STREAM

[76] Inventor: Donald A. Sayles, 767 College Ave., Pittsburgh, Pa. 15232

[22] Filed: Dec. 16, 1975

[21] Appl. No.: 641,234

Related U.S. Patent Documents

Reissue of:

[64] Patent No.: 3,869,370
Issued: Mar. 4, 1975
Appl. No.: 357,627
Filed: May 7, 1973

[52] U.S. Cl. ..... 204/1 T; 73/23; 204/195; 204/195 S

[51] Int. Cl.[2] ..... G01N 31/00; B01K 3/00

[58] Field of Search ..... 73/27 R, 23, 19; 204/195 S, 195 R, 185 F, 195 G, 195 L, 195 M, 1 T, 1 S, 1 Y

[56] References Cited

UNITED STATES PATENTS

| | | | |
|---|---|---|---|
| 1,504,707 | 8/1924 | Peters | 73/27 R |
| 1,874,549 | 8/1932 | Krueger et al. | 73/27 R |
| 2,045,640 | 6/1936 | Fredericks | 73/27 R |
| 2,556,832 | 6/1951 | Vollrath | 73/27 R |
| 2,807,159 | 9/1957 | Wilson | 73/27 R |
| 3,330,960 | 7/1967 | Rich | 250/218 |
| 3,522,010 | 7/1970 | Archer | 73/23 |
| 3,597,345 | 8/1971 | Hickam et al. | 204/195 S |
| 3,616,408 | 10/1971 | Hickam | 204/195 S |

*Primary Examiner*—Richard C. Queisser
*Assistant Examiner*—Stephen A. Kreitman
*Attorney, Agent, or Firm*—Stanley J. Price, Jr.; John M. Adams

[57] ABSTRACT

A loop type sample gas flow conduit has an inlet opening that is connected to an opening in the gas main passageway and an outlet opening connected to a second opening in the main gas passageway. The sample gas flow conduit has a gas inlet leg and a gas outlet leg arranged at spaced relation to each other. A heater element surrounds a portion of the gas inlet leg and a suitable temperature control device provides a temperature differential between the gas inlet leg and the gas outlet leg so that a sample stream of gas is withdrawn from the stream of gas in the main passageway by convection and at a preselected flow rate. An electrochemical sensing cell is positioned in the gas inlet leg and continuously determines the oxygen partial pressure of the gas flowing through the sample gas flow conduit.

5 Claims, 1 Drawing Figure

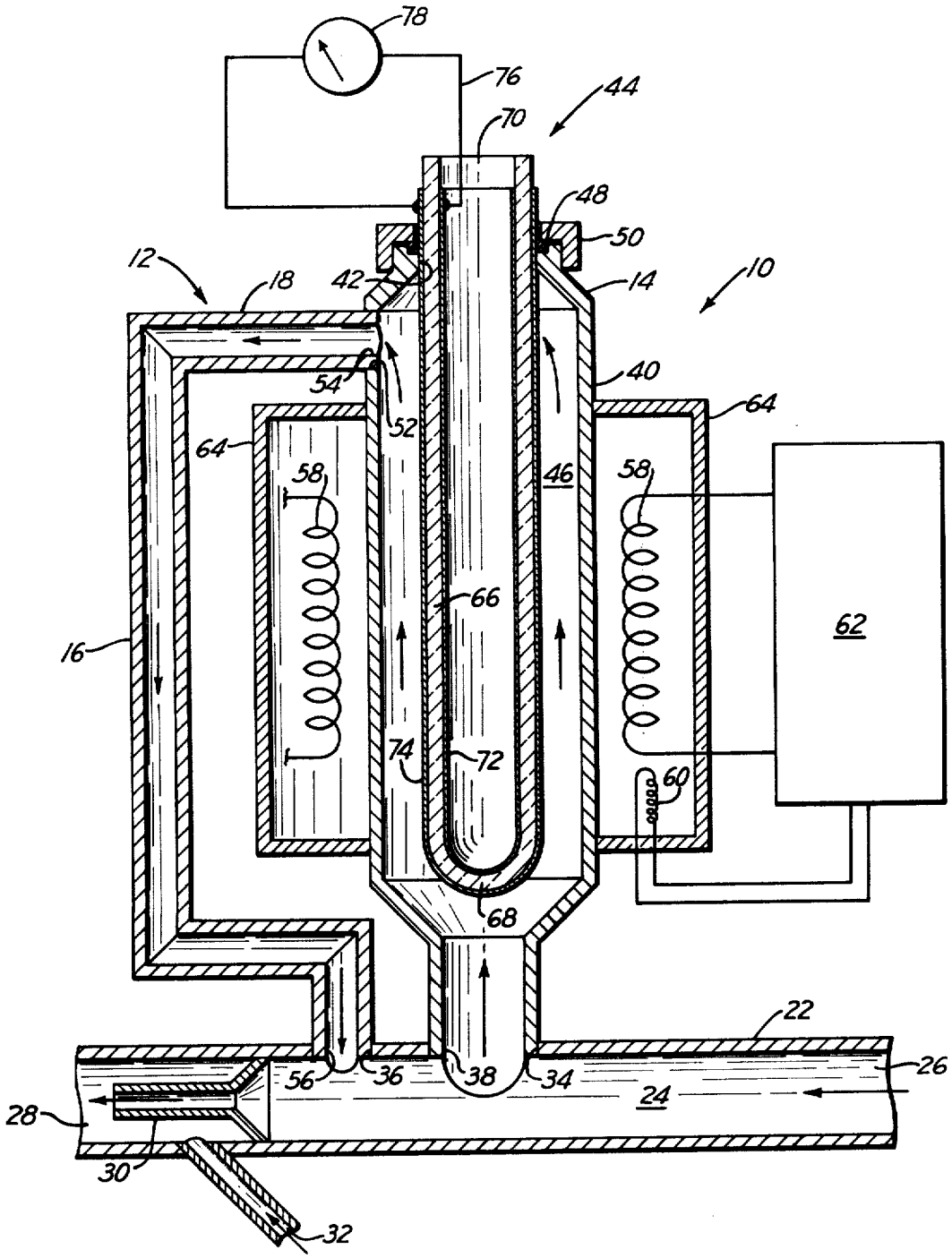
78
76
44
70
48
50
12
18
42
14
10
40
54
52
64
64
58
46
58
66
62
16
74
72
60
68
22
26
56
36
38
34
24
28
30
32

METHOD AND APPARATUS FOR CONTINUOUSLY SENSING THE CONDITION OF A GAS STREAM

Matter enclosed in heavy brackets [ ] appears in the original patent but forms no part of this reissue specification; matter printed in italics indicates the additions made by reissue.

BACKGROUND OF THE INVENTION

1. Field of the Invention

This invention relates to a method and apparatus for sensing the condition of a gas and more particularly to a method and apparatus for continuously withdrawing a portion of the gas from the main gas stream and sensing the condition of the withdrawn gas.

2. Description of the Prior Art

In various industrial applications *as in flue gas analysis* it is necessary to continuously sense the condition of a flowing gas. The conventional methods for sensing the condition of the gas include inserting a probe or a portion of the sensing element into the main stream of flowing gas. Problems are encountered with these conventional methods when the flowing gas stream is dirty or wet or when the gas flow patterns are such that erratic measurements result. The probes or portions of the sensing elements frequently become plugged or contaminated by the wet or dirty gaseous products and provide erratic results. When the sensing apparatus depends on a measurement at a calibrated temperature or a continuous flow rate of the gas, a relatively constant predictable gas flow rate around the sensing element is essential for accurate measurement. An example of such sensing apparatus is [ a gas ] *an oxygen* analyzer that includes a heated ceramic oxide electrolyte electrochemical cell that measures oxygen partial pressure. Excessive flow rates of the gas across the sensing element tends to cool the electrochemical cell so that it is below its calibration temperature and erratic results are obtained. Also, where the flow rate of the gas is slow or static or where the gas is diluted with air, because of reverse flow, erratic results are also obtained. There is a need for a method and apparatus to continuously sense the condition of a gas by providing a small and predictable continuous flow of a portion of the gas over the outside of the sensing element while the major portion of the gas flows through the main gas passageway in an uncontrolled manner.

SUMMARY OF THE INVENTION

This invention is directed to a method and apparatus for continuously sensing the condition of a gas flowing in a main passageway and the apparatus includes a sample gas flow conduit having an inlet opening and an outlet opening connected to spaced openings in the main passageway. The sample gas flow conduit has a gas inlet leg and a gas outlet leg arranged in spaced relation to each other. Means are provided to maintain a temperature differential between the gas inlet leg and the gas outlet leg so that a sample stream of gas is withdrawn from the gas stream in the main passageway by convection and at a preselected flow rate. Gas condition sensing means is positioned in one of the legs of the sample gas flow conduit to sense the condition of the stream of gas flowing through the sample gas flow conduit. The method for continuously sensing the condition of a gas flowing in a main passageway includes connecting the gas inlet leg of a sample gas flow conduit to [ an ] *a first* opening in the main passageway and connecting the gas outlet leg of the gas flow conduit to a second opening *that is down stream from the first opening and* in the main passageway. A gas sensing device is positioned in one of the legs of the gas flow conduit and a temperature differential is maintained between the gas inlet leg and the gas outlet leg so that a sample stream of gas is withdrawn from the gas flowing in the main passageway by convection at a preselected rate and is sensed by said gas sensing device.

In a preferred embodiment the gas sensing device includes a gas analyzer with a flow system and heat components arranged so that the temperature differential *is maintained* between a first portion of the apparatus containing an electrochemical sensing cell and a second portion containing a return flow path that is at a lower temperature than the first portion of the apparatus. The temperature differential between the portions of the apparatus produces by convection a [ nearly constant and ] predictable flow rate of gas *up* past the [ condition ] *outside of the oxygen* sensing device and the flow rate is independent of the total gas flow rate in the main passageway. The flow of the remainder of the gas in the main passageway is restricted and can be exhausted directly to ambient atmosphere in the case of a gas source that is at a higher pressure than atmospheric pressure or to an aspirator in the case of a gas source that is at a pressure lower than atmospheric pressure.

Accordingly, the principal object of this invention is to provide a method and apparatus for sensing the condition of a gas that is not dependent on the flow rate of the main gas stream.

Another object of this invention is to provide a method and apparatus for sensing the condition of a gas stream that is not affected by the contaminants in the gas stream.

These and other objects and advantages of this invention will be more completely disclosed and described in the following specification, the accompanying drawing and the appended claims.

BRIEF DESCRIPTION OF THE DRAWING

The drawing is a schematic illustration of my improved gas condition sensing device.

DESCRIPTION OF THE PREFERRED EMBODIMENT

Throughout the specification the sensing device is designated as a gas condition sensing device. The term "condition" is intended to designate either the physical or chemical or other properties of the gas flowing through the sample gas flow conduit [ . ] , *as for example, sensing the oxygen partial pressure of a gas stream.*

The gas condition sensing device generally designated by the numeral 10 includes a sample gas flow conduit generally designated by the numeral 12 that has a first *straight* vertical leg or section 14 and a second vertical leg or section 16. The vertical sections 14 and 16 are connected to each other by an intermediate section 18. The sample gas flow conduit 12 may be fabricated from tubing, piping or other suitable material to provide a gas flow passageway therethrough.

In the schematic drawing the inlet and outlet of the sample gas flow conduit 12 is connected as a loop to a main conduit 22. The conduit 22 has a main passageway 24 therein through which the main stream of gas flows. Although the conduit 22 is illustrated as a relatively narrow conduit, it is intended that the conduit 22 designate the main passageway 24 of any apparatus, such as a stack or the like, through which a gas is flowing and it is desired to determine one or more of the conditions of the gas. The main conduit 22, as illustrated, has an inlet portion 26 and an outlet portion 28 and the gas flows therethrough in the direction of the arrow as shown in the drawing. In certain instances where the pressure of the gas in conduit 22 is below atmospheric pressure a conventional aspirator 30 may be positioned in the main passageway 24 to assure positive flow of the gas through the conduit 22 in the direction indicated. An auxiliary gas, such as air, is introduced through the conduit 32 to provide positive flow of the gas in the main passageway 24 and prevent back flow of air from the atmosphere.

The main conduit 22 has a first opening 34 that serves as an inlet opening for gas flow conduit 12 and a second opening 36 downstream from the first opening 34 that serves as an outlet opening for gas flow conduit 12. Although the openings 34 and 36 are illustrated relatively close to each other, it should be understood that the space between the openings may be increased or decreased as long as the openings are spaced a sufficient distance that the gas flowing from the conduit 12 through outlet opening 36 into the main passageway 24 is preferably not intermixed with the gas flowing from the main passageway into the conduit through the first opening 34.

The sample gas flow conduit first vertical leg 14 has an inlet opening 38 which is positioned in the opening 34 of main conduit 22 and is arranged, as later described, to permit a predictable portion of the gas flowing through main passageway 24 to be diverted into the conduit 12 for condition sensing by various types of condition sensing devices in the conduit 12. It is preferred to position the conduit 12 in vertical relation to the main conduit 22 [ where the ]. *The* gas flowing through the main passageway 24 is from an industrial operation that produces either dirty or wet gaseous products. However, the vertical position of the conduit 12 is not essential for the operation of the improved gas condition sensing device as long as the legs are in a vertical rather than a horizontal plane.

The first leg or inlet section 14 of gas flow conduit 12 has an enlarged intermediate portion 40 with an open top portion 42. A sensing device generally designated by the numeral 44 extends through the opening 42 into the internal portion 46 of the inlet section enlarged portion 40. A suitable O-ring 48 and cap member 50 seal the opening 42 around the sensing device 44 and support the sensing device 44 in the first leg internal portion 46. The first leg enlarged portion 40 has an outlet opening 52 therein to permit the gas flowing upwardly through the first leg 14 to flow around the sensing device 44 and outwardly through the opening 52.

The intermediate connecting section 18 has an open end portion 54 extending through opening 52 and provides an exhaust opening for the gas flowing upwardly through the first vertical section 14. The gas flows through the connecting section 18 to the second vertical section or leg 16. The second vertical section 16 of conduit 12 has one end connected to the connecting section 18 and another end portion 56 that is connected in the opening 36 of main conduit 22. With this arrangement a portion of the gas flowing through the main passageway 24 is continuously withdrawn from passageway 24 through opening 32 and flows upwardly through the first leg 14 of loop 12 around the sensing device 44 and then horizontally through the intermediate section 18 and downwardly through the second vertical leg 16 to the passageway 24 downstream of opening 34.

To provide a predictable continuous flow of gas through the conduit loop 12 a temperature differential is maintained between the vertical legs 14 and 16 by a heater element 58 that is positioned around the enlarged section 40 of the first leg 14. The heater element 58 is controlled by means of a temperature sensor 60 and the temperature in the enlarged portion 40 is maintained at a preselected value in the range of 1,100° F. to 1,600° F. by means of a conventional temperature controller 62. An enclosure 64 houses the heater element 58 to confine the increased temperature to the first leg 14 and maintain the temperature differential between the first leg 14 and second leg 16. It will be apparent with this arrangement that the temperature of the first leg of the conduit or loop 12 will be maintained at a higher temperature than the second leg 16. [ Although a heater element is illustrated for maintaining this temperature differential, it will be apparent that a temperature differential could be obtained by cooling the second leg 16 and thereby provide a temperature differential between the legs 14 and 16 to obtain the convective flow hereafter described. ]

The [ temperature ] sensing device 44 illustrated in the drawing is a ceramic oxide electrolyte electrochemical cell that measures the oxygen partial pressure of the sample. The sensing device includes a tube 66 of ceramic oxide material having a closed end portion 68 and an open end portion 70. The tube 66 is positioned in the enlarged portion 40 of the first vertical leg with the closed end portion 68 adjacent the gas inlet opening 38 and the open end of the tube extends beyond the O-ring seal 48. The inside of the tube 66 is coated with a porous conductive electrode 72 and the outside of the tube is coated with a second similar porous electrode 74. The electrodes 72 and 74 are connected through a circuit 76 to a voltage measuring device 78 which is arranged to indicate the EMF produced by the electrochemical cell. The electrochemical cells for measuring oxygen partial pressure are well known and a suitable cell is disclosed in U.S. Pat. No. 3,597,345 or in Applicant's co-pending application, Ser. No. 261,017, entitled "Method For Measuring Ratio Of Fuel Materials To Combustion Products In A Gas."

[ It should be understood that it is not intended to limit the instant invention to the specific type of condition sensing device illustrated in the drawing and other condition sensing devices that require a constant flow of the gas to pass across a portion of the sensing device may be employed in the same manner as the condition sensing device illustrated. ]

The gas condition sensing device 10 may be fabricated in such a manner that it is a unitary device suitably housed and mounted to a portion of the gas producing or conveying apparatus, such as boilers, smoke stacks, metallurgical furnaces or the like. The gas condition sensing device could be mounted in a box on the outside of the wall of the apparatus by means of a pipe flange or the like. Other suitable means for permanently attaching the gas condition sensing device may also be employed.

According to the provisions of the patent statutes, I have explained the principle, preferred construction and mode of operation of my invention and have illustrated and described what I now consider to represent its best embodiment. However, it should be understood that, within the scope of the appended claims, the invention may be practiced otherwise than as specifically illustrated and described.

What is claimed is:

1. Apparatus for continuously sensing the condition of a gas flowing in a main passageway comprising, a sample gas flow conduit having an inlet opening and an outlet opening connected to spaced openings in the main passageway, said sample gas flow conduit having a gas inlet leg extending upwardly at an angle to the earth's surface and a gas outlet leg extending downwardly at an angle to the earth's surface, said gas inlet leg and said gas outlet leg arranged in spaced relation to each other and operable to provide a difference in static head therebetween, means to heat said gas inlet leg and maintain a temperature differential between said gas inlet leg and said gas outlet leg so that a sample stream of gas is withdrawn from said gas flowing in said main passageway by convection and at a preselected flow rate, said gas inlet leg includes an enlarged portion, and a ceramic oxide electrolyte electrochemical cell positioned in said enlarged portion of said gas inlet leg of said gas flow conduit to measure the oxygen partial pressure of said stream of gas flowing through said sample gas flow conduit.

2. Apparatus for continuously sensing the condition of a gas flowing in a main passageway as set forth in claim 1 which includes, temperature control means to maintain the temperature of said gas inlet leg at a preselected temperature.

3. A method for continuously sensing the condition of a gas flowing in a main passageway comprising, connecting a gas inlet leg of a sample gas flow conduit to an opening in the main passageway, connecting a gas outlet leg of said sample gas flow conduit to a second opening in said main passageway, said gas inlet leg and said gas outlet leg arranged in spaced relation to each other and operable to provide a difference in static head therebetween, positioning a ceramic oxide electrolyte electrochemical cell in one of said legs of said gas flow conduit, and heating said gas inlet leg and maintaining a temperature differential between said gas inlet leg and said gas outlet leg so that a sample stream of a gas is withdrawn from said gas flowing in said main passageway by convection at a preselected flow rate and measuring the oxygen partial pressure of said sample stream of gas.

4. A method for continuously sensing the condition of a gas flowing in a main passageway as set forth in claim 3 which includes, maintaining the temperature of said gas inlet leg at between about 1,100° F. to 1,600° F.

5. Apparatus for continuously sensing the condition of a gas flowing in a main passageway comprising, a sample gas flow conduit having an inlet opening and an outlet opening connected to spaced openings in the main passageway, said sample gas flow conduit having a gas inlet leg extending upwardly at an angle to the earth's surface and a gas outlet leg extending downwardly at an angle to the earth's surface, said gas inlet leg and said gas outlet leg arranged in spaced relation to each other and operable to provide a difference in static head therebetween, means to maintain a temperature differential between said gas inlet leg and said gas outlet leg so that a sample stream of gas is withdrawn from said gas flowing in said main passageway by convection and at a preselected flow rate, and a ceramic oxide electrolyte electrochemical cell positioned in one of said legs of said sample gas flow conduit to measure the oxygen partial pressure of said stream of gas flowing through said sample gas flow conduit.

* * * * *